Nov. 17, 1931.  E. BAREFOOT  1,831,900
TOOL
Filed April 10, 1930
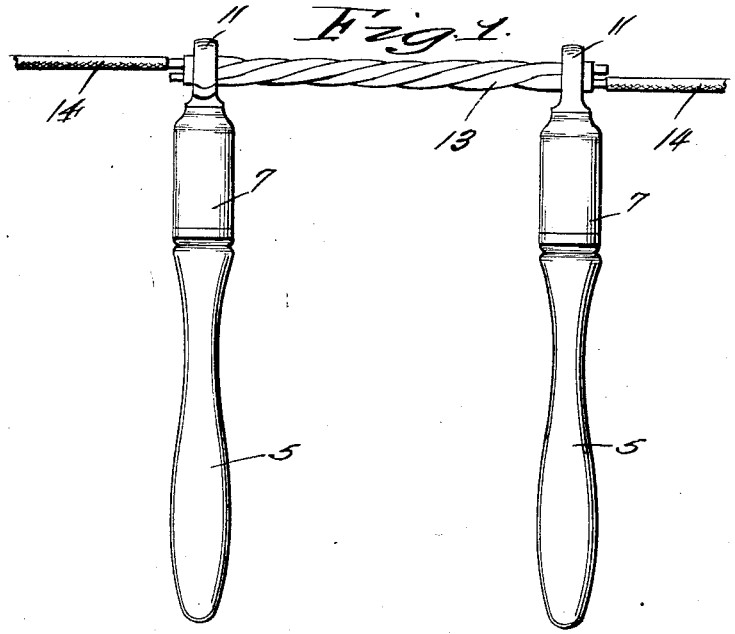
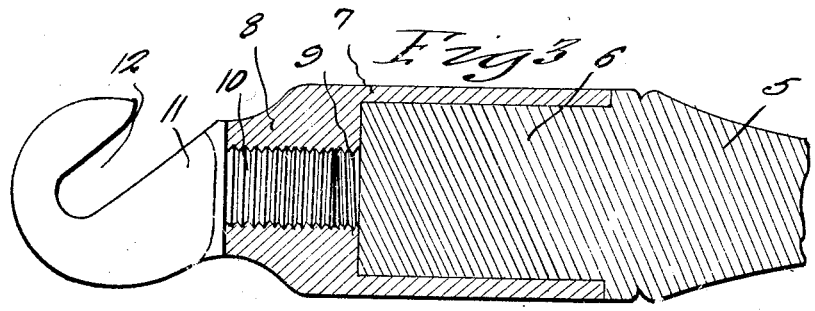

Patented Nov. 17, 1931

1,831,900

UNITED STATES PATENT OFFICE

EARL BAREFOOT, OF MOUNT VERNON, NEW YORK

TOOL

Application filed April 10, 1930. Serial No. 443,122.

This invention appertains to new and useful improvements in hand tools, and more particularly to a novel tool for use in twisting coupling tubes in connecting electrical conductors.

The practice of connecting electrical conductors by inserting the same into a metallic tubing in overlapping relation to each other and twisting the tubing and conductor end in overlapping relation, subjects the workmen to hazards, especially when working with line wires or in the neighborhood of line wires.

During the course of the following specification and claims, several important objects and advantages of the invention will readily become apparent to the reader.

In the drawings:—

Figure 1 discloses a pair of the novel tools engaged with the coupling, after the coupling has been formed.

Fig. 2 represents a side elevational view of one of the tools engaged with a coupling tube.

Fig. 3 is an enlarged fragmentary sectional view.

Referring to the drawings wherein like numerals designate like parts, it can be seen that each of these tools comprises a suitably formed handle 5, preferably of nonconducting material.

One end of this handle 5 is reduced as at 6 for disposition into the socket 7 of the head structure 8. The handle can be held in the socket in any suitable manner, the drawings showing the reduced end of the handle being driven into the socket. This head structure 8 has a threaded bore 9 therein to receive the threaded shank 10 of the hook 11.

This hook 11 is substantially circular in shape and provided with a substantially rectangular-shaped opening 12 to receive the metallic tubing 13. which is usually of substantially rectangular cross section.

The hooks 11 are removable so that hooks of various sizes may be used with the same handle. It can be seen that after the conductor wires 14 have their ends engaged within the tube 13, when these tools are engaged with each end of the tube and by swinging these tools in inverse directions, the tubing 13 is twisted in the manner shown in Fig. 1.

Thus the hands of the workmen are always away from the wires and furthermore, a very limited movement of the tools will result in the necessary twist of the tubing.

While the foregoing specification sets forth the invention in detail, it is to be understood that numerous changes in the shape, size and materials may be resorted to without departing from the spirit or scope of the invention as claimed hereinafter.

Having thus described my invention, what I claim as new is:—

1. A tool for twisting a tubular coupling member about electrical conductors comprising a handle, a head connected with the handle and a member detachably connected with the head and having a diagonal arranged slot therein opening and at the one edge of the member for forming the member into a hook, the side walls of the slots being parallel for receiving the coupling tube with its flattened side engaging the parallel walls of the slot.

2. A tool of the class described comprising a handle, a head connected with the handle and having its outer part substantially circular in shape with its sides flattened and said circular part having a diagonal slot therein opening out through one edge of the member adjacent the point of connection of the said member with the head, the closed end of the slot being remote from said point, and the side walls of the slot being straight and parallel with each other.

In testimony whereof I affix my signature.

EARL BAREFOOT.